US007267019B2

(12) United States Patent
Morris et al.

(10) Patent No.: US 7,267,019 B2
(45) Date of Patent: Sep. 11, 2007

(54) METHOD OF INSPECTING OR UTILIZING TOOLS IN A NUCLEAR REACTOR ENVIRONMENT

(75) Inventors: David T. Morris, Jumping Branch, WV (US); Terry Lynn Chapman, Los Gatos, CA (US); Trevor James Davis, Charlotte, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/294,433

(22) Filed: Dec. 6, 2005

(65) Prior Publication Data
US 2007/0125190 A1 Jun. 7, 2007

(51) Int. Cl.
*G01M 19/00* (2006.01)
(52) U.S. Cl. ..................................... 73/865.8
(58) Field of Classification Search ............... 73/866.5, 73/865.8
See application file for complete search history.

(56) References Cited
U.S. PATENT DOCUMENTS 3,780,571 A * 12/1973 Wiesener .................... 376/249
4,505,874 A * 3/1985 Warren et al. ............... 376/249
4,686,078 A * 8/1987 Zwart, Jr. .................... 376/249
5,105,346 A * 4/1992 Acks et al. .................. 362/267
5,193,405 A * 3/1993 Oomichi et al. ........... 73/865.8
5,734,690 A * 3/1998 Sakamaki .................... 376/260

FOREIGN PATENT DOCUMENTS

JP          09222492 A  *  8/1997

* cited by examiner

*Primary Examiner*—Hezron Williams
*Assistant Examiner*—Tamiko Bellamy
(74) *Attorney, Agent, or Firm*—Nixon & Vanderhye, PC (57) ABSTRACT

A method of inspecting or utilizing tools in the underwater environment of a nuclear reactor vessel, a spent fuel pool or equipment pit includes floating a platform for transporting inspection devices and/or tools over an underwater target site and deploying the devices or tools to the underwater target site. The platform may be coupled to a boom whose opposite end is carried by a cart movable about a floor area surrounding the pool. Alternatively, the platform may be independently movable along the water surface by thrusters.

11 Claims, 6 Drawing Sheets

METHOD OF INSPECTING OR UTILIZING TOOLS IN A NUCLEAR REACTOR ENVIRONMENT

BACKGROUND OF THE INVENTION

The present invention relates to a method of deploying non-destructive examination and/or support equipment for underwater inspection and repair of welds and mechanical structures in a nuclear reactor environment and particularly relates to the transportation and deployment of inspection and/or work tools in the underwater environment in any one of a nuclear reactor vessel, a spent fuel pool or an equipment pit at a nuclear reactor site.

Submerged welds and mechanical structures in a nuclear reactor environment such as the reactor vessel, a spent fuel pool or an equipment pit require periodic non-destructive examination to assess their structural integrity and repair if necessary in order to assure continued reliability and the performance of their functions. These examinations are normally conducted during outages when there is a high intensity of concurrent repair/modification work being performed in adjacent areas, often with very limited access. The non-destructive examination and support equipment for performing repair work may include for example various customized tooling fixtures, cameras, cable reels, push-pull devices, telescoping arms/assembles, hydraulic systems, vacuum hoses, eddy current probes and other equipment.

Equipment used to transport and position non-destructive examination equipment for examination of and work on submerged welds and other structures have included bridges, platforms and submersibles. Bridges and platforms have only a limited amount of work space with the result that tasks to be performed from them must often be done in series thereby extending overall plant outage durations. Also, when using a refueling bridge for inspection or other work, no such other activity is possible from the refueling bridge during fuel movement. Submersibles eliminate the need to use the bridge or platform for most tasks thus reducing scheduling conflicts and allowing work to be performed in parallel. However, submersibles have a high initial cost and tend to be costly and relatively complex from a maintenance perspective while managing their profile and delivery systems. Accordingly, there has developed a need for a method of delivering equipment to be used in the performance of underwater non-destructive examinations and repair work in a manner which precludes obstruction of or interference with other activities occurring in the vicinity of the examinations or repair, i.e., nuclear fuel movement, and provides versatility and capability for critical and non-critical path work in the reactor vessel, equipment pit and spent fuel pool.

BRIEF DESCRIPTION OF A PREFERRED EMBODIMENT

In accordance with a preferred aspect of the present invention, there is provided a method of inspecting or utilizing tools in the underwater environment of at least one of a nuclear reactor vessel, a spent fuel pool or an equipment pit at a nuclear reactor site comprising the steps of (a) floating a platform on the surface of water in a water pool overlying a portion of one of the reactor vessel, the spent fuel pool and the equipment pit, and (b) deploying an inspection device or a tool from the floating platform to a target site below the water surface to inspect or perform work at the target site.

In another aspect of the present invention, there is provided a method of inspecting or utilizing tools in the underwater environment of at least one of a spent fuel pool or an equipment pit at a nuclear reactor site comprising the steps of: (a) removing a steam dryer from a nuclear reactor vessel and disposing the dryer in one of the spent fuel pool and equipment pit; (b) supporting a frame from the steam dryer adjacent the surface of water in a water pool overlying a portion of the one of the spent fuel pool and the equipment pit; and (c) deploying an inspection device or a tool from the frame to a target site below the water surface to inspect or perform work at the target site.

Figure 1:
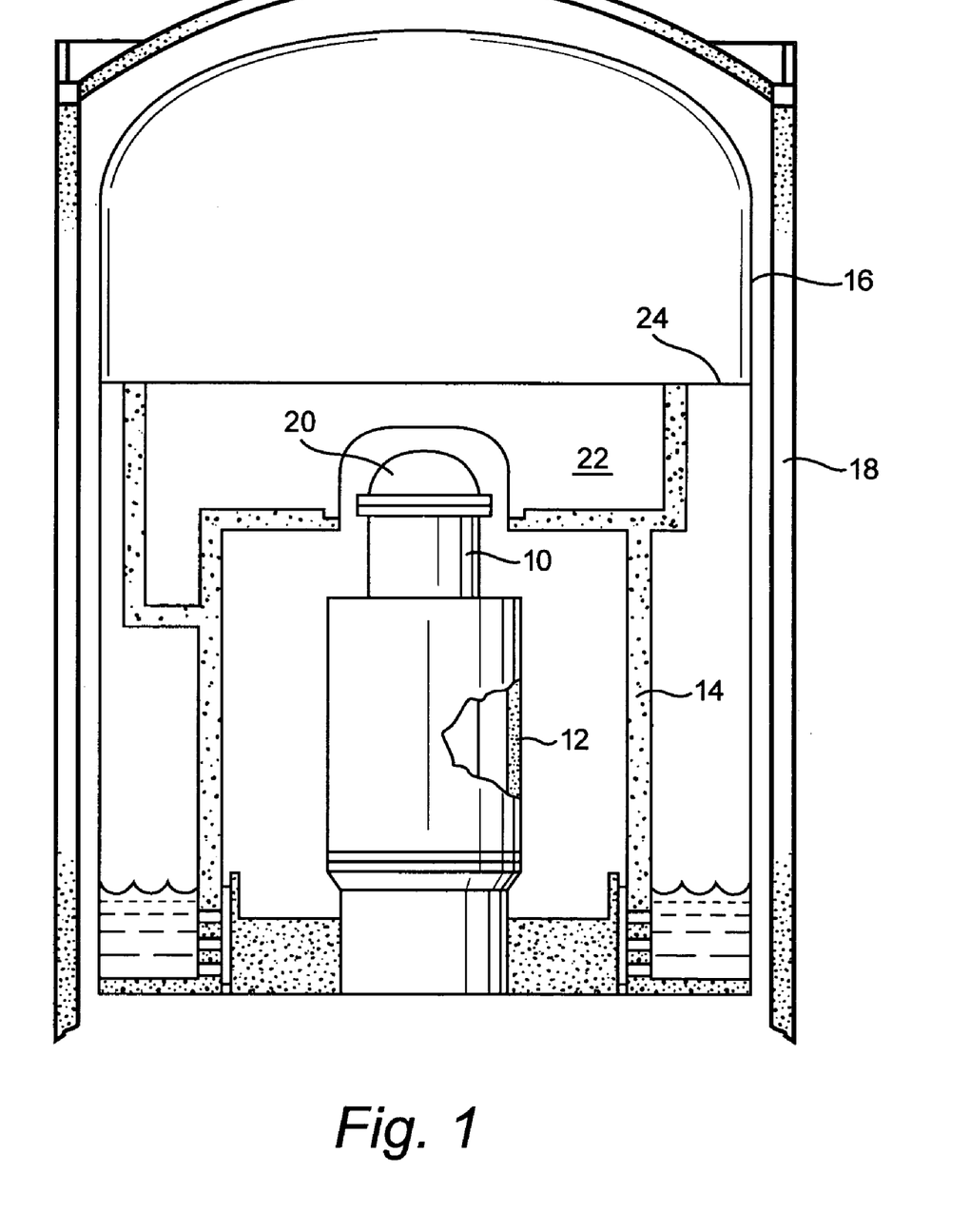
FIG. 1 is a cut away schematic illustration of a reactor building illustrating a containment and shield building.
Figure 2:
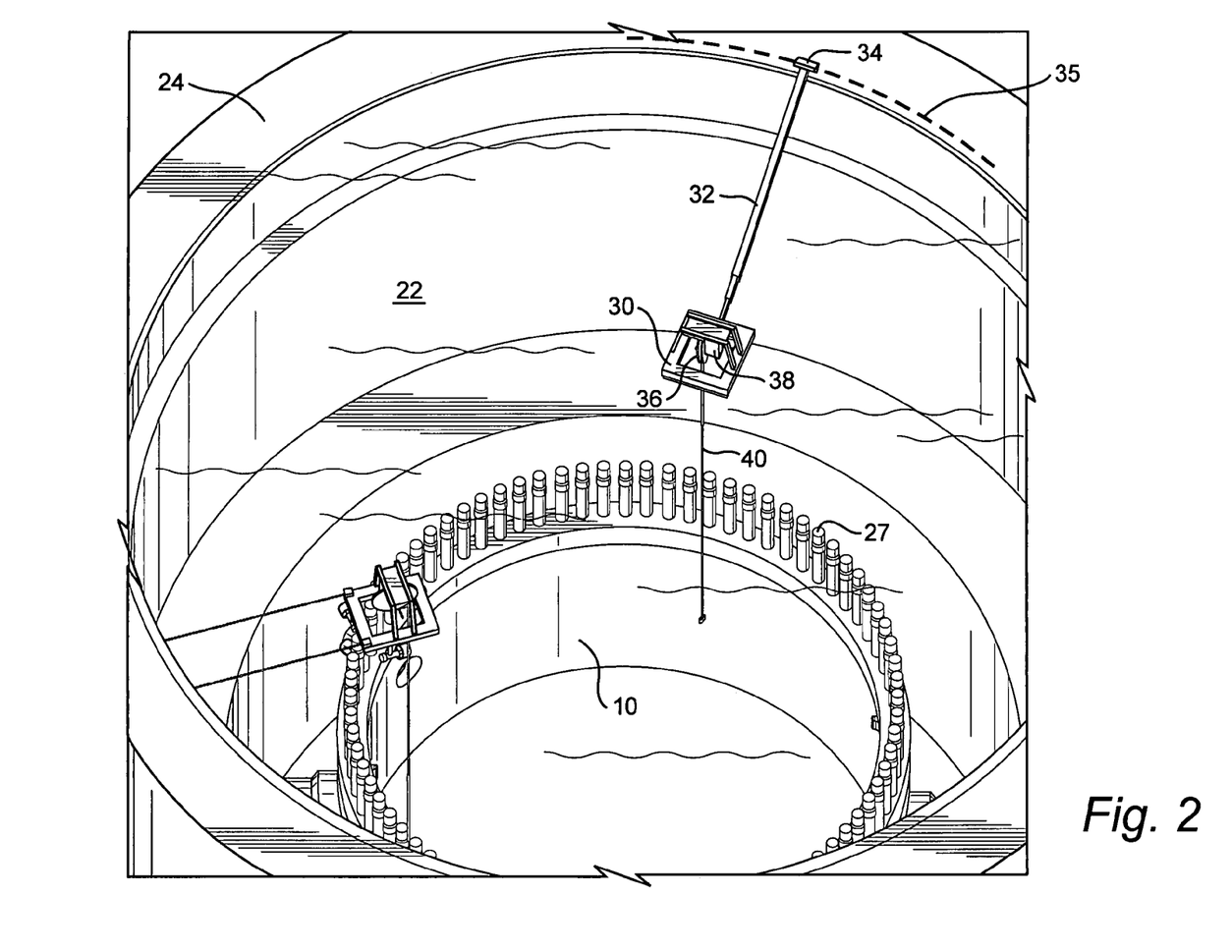
FIG. 2 is a fragmentary perspective view of the cavity or upper pool area of the reactor vessel with the upper pressure dome removed and illustrating a floor area about the vessel.

Referring now to the drawings, particularly to FIG. 1, there is illustrated a nuclear reactor vessel 10 surrounded by a reactor shield wall 12, both disposed in a dry well 14. The reactor vessel 10 is disposed within a containment structure 16 surrounded by a shield building 18. In FIG. 1, the upper pressure dome 20 of the reactor vessel is illustrated secured to the vessel 10. In an upper cavity or pool area 22 above the pressure dome 20, the reactor vessel is surrounded by a floor area 24, i.e., an area above the water level in the flooded cavity or upper pool 22. It will be appreciated that when work is to be performed within the reactor vessel 10, the water level in the pool area 22 is raised to an elevation short of the floor area 24, e.g. about six inches below the floor area 24, such that, upon removal of the pressure dome 20, the interior of the reactor vessel is maintained under water. In FIG. 2, the pressure dome 20 has been removed from the vessel 10 exposing the studs 27 typically used to secure the dome to the vessel 10.

In accordance with a preferred embodiment of the present invention, there is provided a method for transporting and deploying inspection and other work equipment for underwater inspection and work on welds and mechanical structures. Referring again to FIG. 2, there is illustrated a floating platform 30 secured at one end to an extensible and retractable, e.g., telescopic boom 32. The opposite end of boom 32 is connected to a guide 34 for pivotal movement about a horizontal axis. Guide 34 may be displaced about a track 35 along the floor area 24. The platform 30 includes a cable reel 36 and a motor 38 for deploying cable 40 from and retracting cable 40 onto the cable reel 36. The cable 40 carries at its lower end any one or more of the above noted inspection or work tools. It will be appreciated that the invention is not limited to any particular type of inspection or work tool but can be utilized to locate any inspection or work tool at any underwater site in a nuclear building environment to perform any task capable of being performed by an underwater tool.

Platform 30 may comprise essentially any form of structure which may be floated on the surface of the water in the pool area 22. For example, the platform 30 may be formed of an assembly of flotation devices secured together for supporting the cable reel, motor, cable and other equipment on the surface of the water in the pool 22. By locating the guide 32 at a selected circumferential position along the track 35, and with the ability of the boom 34 to extend and retract as well as pivot about a horizontal axis at the connection between the boom and guide 34, it will be appreciated that the cable 40 can be located vertically over any desired underwater target site which is to be inspected or upon which work is to be performed and notwithstanding the water level in pool area 22. Control of the motor 38 and cable reel 36 can of course be accomplished using electrical leads passing through the boom 32 to the motor 38 from a control station on the floor area 24 or elsewhere. Wireless control may also be effected.

Figure 3:
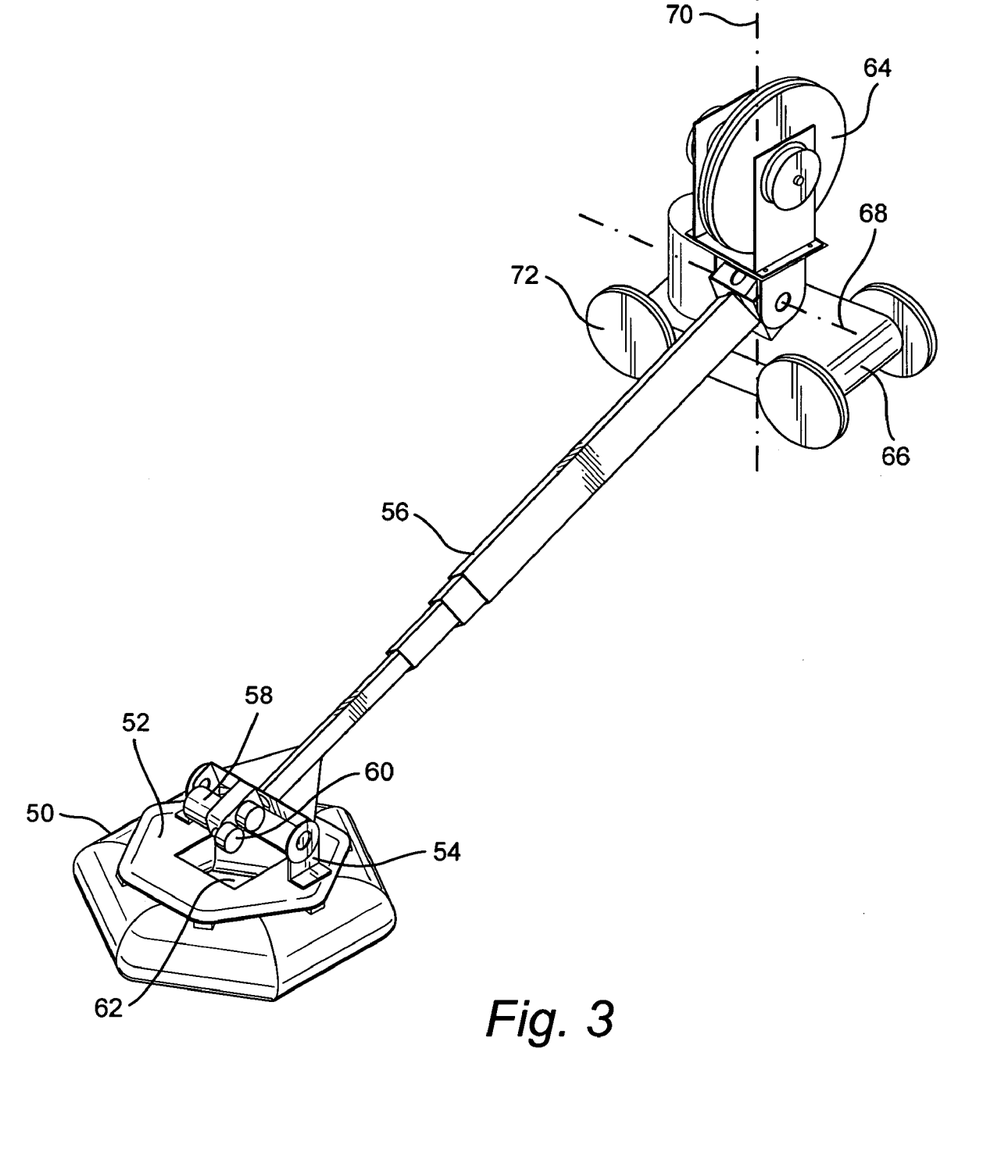
FIG. 3 is a perspective view illustrating a mechanism for deploying a floating platform from the floor area about the upper pool area for supporting the transportation and deployment of inspection and other tools to an underwater site.

Referring to FIG. 3, there is illustrated a further embodiment of a floating work platform. In FIG. 3, the floating platform 50 may comprise an assembly of flotation devices for example pontoons supporting a deck 52 on which is mounted side supports 54 pivotally mounting the end of a telescopic boom 56 to the floating platform 50. Also illustrated in FIG. 3 is a cable drive 58 coupled to a pulley 60 for guiding the cable through a central opening 62 in the deck 52 of platform 50. The cable extends from the pulley 60 along the boom 56 to a cable reel 64 mounted on a cart 66. The outer end of boom 56 is mounted on a horizontal pivot carried by cart 66 for pivotal movement about a horizontal axis 68. The horizontal pivot is, in turn mounted on a vertical pivot indicated by the axis 70. The movement of the boom about the vertical and horizontal axes may be controlled by motors or manually. The cart 66 may have wheels 72 enabling the cart to roll along the floor surface 24 or to be guided on floor surface rails. Also, the cable reel 64 may be spring loaded to bias the cable for retraction.

By mounting the boom on horizontal and vertical axes, the boom can swing laterally displacing the platform 50 along the surface of the water in a generally arc-like path and can accommodate elevational changes depending upon the level of water in the pool area of the reactor vessel. By extending or retracting the telescopic boom 56 in conjunction with controlled movement of the boom about the horizontal and vertical axes, the platform 50 can be located at any surface location within the pool area and hence vertically overlie the target site for the inspection or work. When properly located, the cable drive 58 is actuated to extend the cable carrying the tool to the underwater target site to perform the inspection or work. It will be appreciated that the cable reel 64 need not be carried by the cart 66 but can be located directly on the platform 50 as in the embodiment illustrated in FIG. 2.

Figure 4:
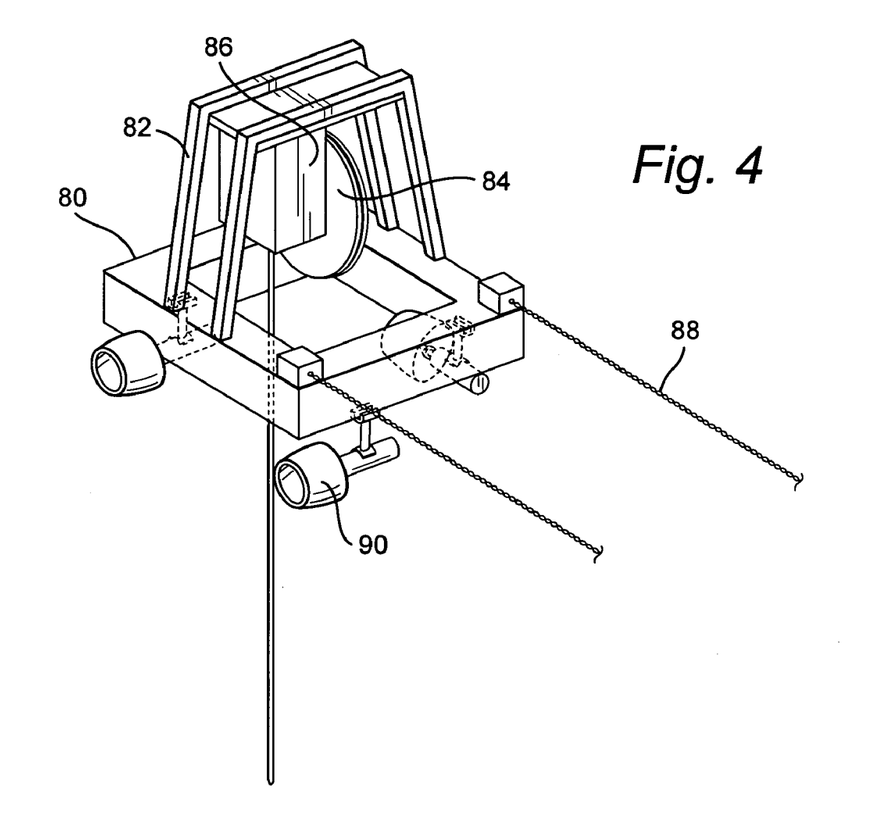
FIG. 4 is a perspective view of a further form of floating platform in accordance with a preferred embodiment of the present invention.

Referring to FIG. 4, there is illustrated another form of floating platform 80. In this embodiment, platform 80 comprises an assembly of flotation devices, for example pontoons, carrying a structure 82 for supporting a cable reel 84 and a reversible motor 86 for driving the cable reel 84. The platform 80 may be tethered to the floor area 24 by a pair of flexible lines 88.

The outboard ends of the lines 88 may be fixed to the floor area or to a movable guide or cart as previously described. To position the platform 80, directionally controlled thrusters 90 may be carried by the platform 80. The thrusters 90 may have electric motor driven impellers which can be rotated about vertical axes to impart thrust to the platform 80 in any lateral direction, i.e., rotated 360° about a vertical axis. By rotatably positioning the thrusters 90, the platform 80 can be transported to and deployed over an underwater target site. One of the lines 88 may carry the power supply for the motor 86 to drive the cable reel 84 as well as to drive and position the thrusters 90. The floating platform 80 of this embodiment is illustrated also in FIG. 2 although it will be appreciated that only one of the platforms 30 or 80 would be typically used.

Figure 5:
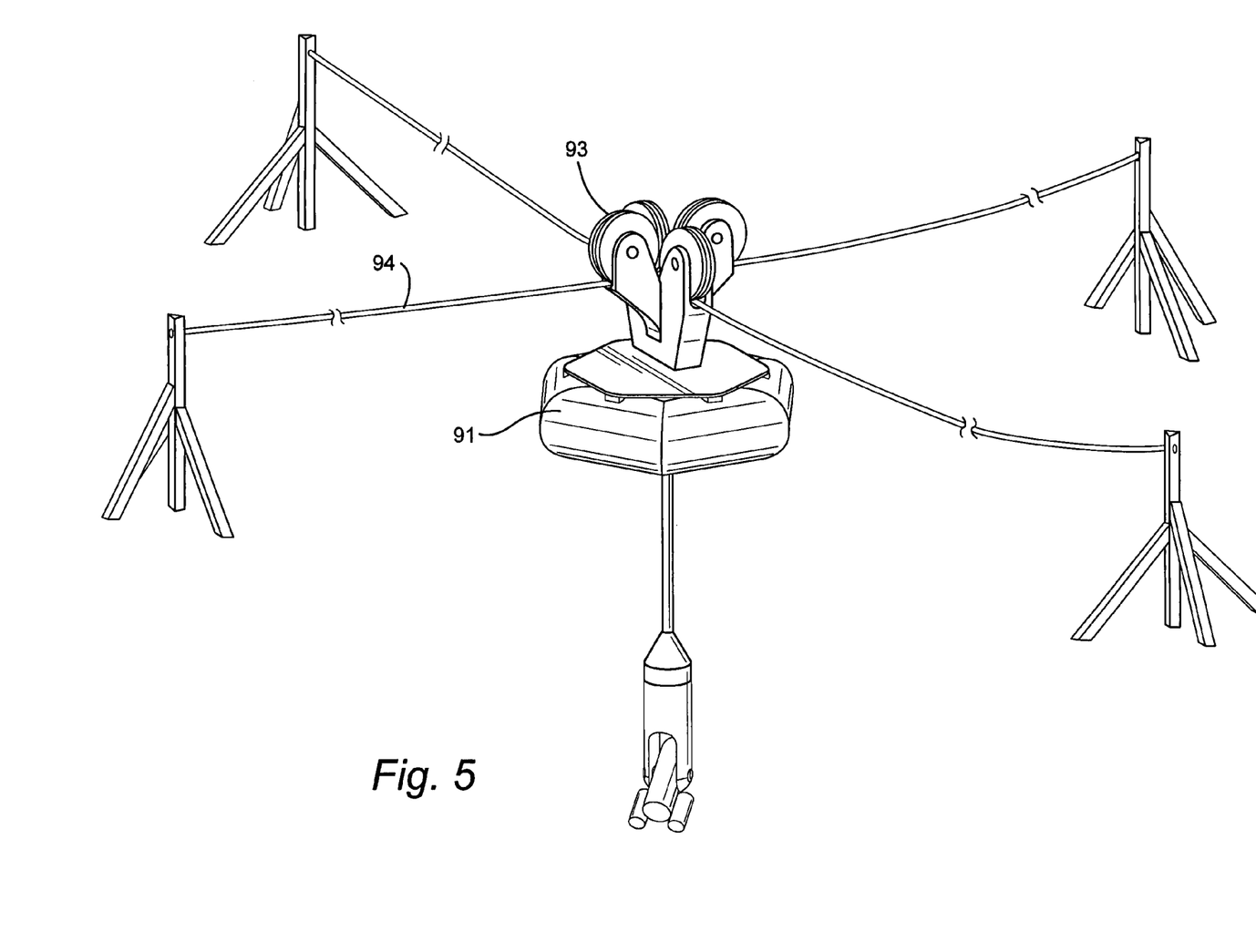
FIG. 5 is a perspective view of a further mechanism for deploying the floating platform.

Referring now to drawing FIG. 5, there is illustrated a further mechanism for locating the inspection or work tools. In this embodiment, the floating platform 91 carries a cable reel and motor similarly as in the previous embodiment for deploying the cable to suspend the inspection or work tools at the desired location. In this embodiment, the platform 91 also includes four cable reels 93 to which cables 94 are attached. Opposite ends of cables 94 are attached to fixed locations about the floor area above the reactor vessel. The cable reels 93 are oriented at 90° relative to one another and hence the cables 94 are oriented at 90° relative to one another. By selectively winding and unwinding various ones of the cable reels 93, the floating platform 91 can be located above an inspection or work location within the reactor vessel such that the inspection or work tools can be lowered to perform their intended function. For example, by winding the cable on one of the reels 93 and unwinding the cable from the opposite reel 93 and unwinding cables from the remaining two cable reels, the floating platform can be displaced along the direction of the cable which is being wound on the cable reel. Thus, by variously winding and unwinding the various cables, the platform can be displaced over any intended location in the reactor vessel. It will be appreciated that the movements performed using four cable reels in this embodiment could also be accomplished using fixed cables and a drive mechanism to move the floating platform along the length of the cable. It can also be appreciated that similar motion could be accomplished by using drive rollers in the place of cable reels 93.

Figure 6:
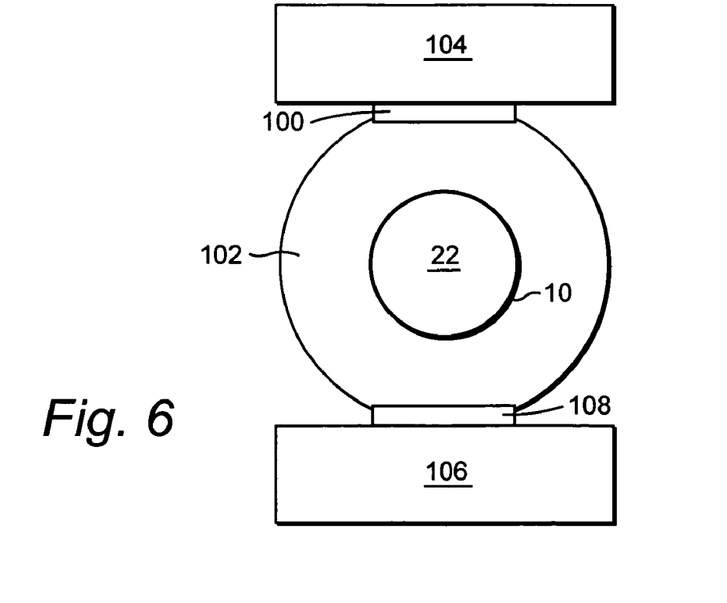
FIG. 6 is a schematic plan view of a reactor building illustrating a spent fuel storage pool and equipment pit alongside the upper pool overlying the reactor vessel.

It will be appreciated that one or more of the different types of platforms may be utilized in any reactor vessel to locate the inspection devices and/or tools underwater at a target site. Also, the floating platforms hereof may not only be utilized in the upper pool 22 of the reactor vessel but may be utilized in the flooded equipment pit or fuel storage pool in the reactor building for similar purposes. For example, and referring to the schematic plan view of a portion of a reactor building illustrated in FIG. 6, the upper pool 22 may have a shield wall with a removable gate 100 between the reactor well 102 and the spent fuel storage pool 104. The equipment pit 106 may have shield blocks 108 separating the well from the pit. Any one of the various platforms disclosed herein may be used in these areas flooded with water to elevations corresponding to the elevation of the water in the upper pool 22.

Figure 7:
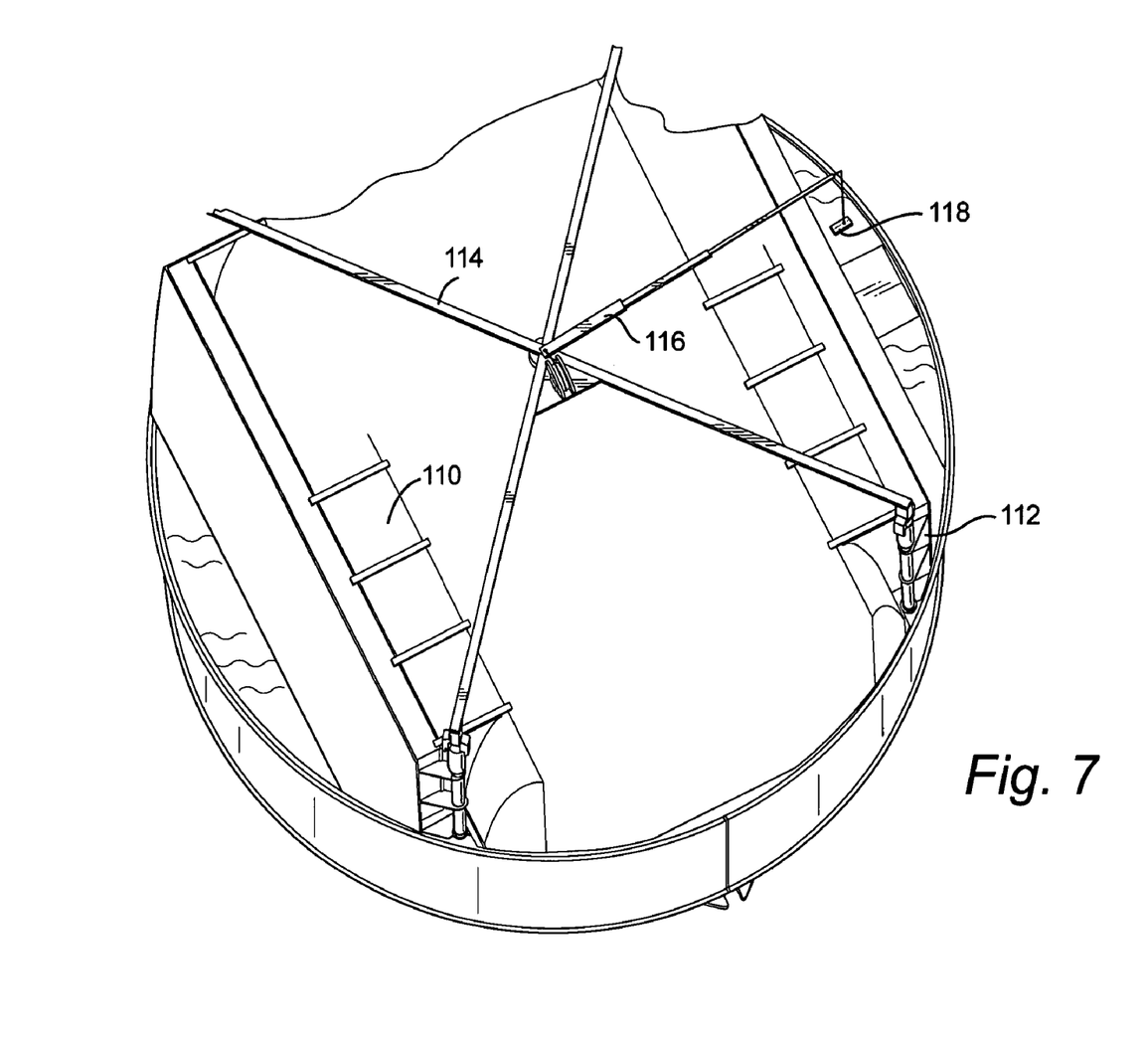
FIG. 7 is a fragmentary perspective view of a frame mounted to lugs of the steam dryer located in a spent fuel pool or in an equipment pit.

In a further embodiment hereof illustrated in FIG. 7, there is illustrated schematically a steam dryer 110 situated over the spent fuel pool or equipment pit. The mounting lugs 112 used to mount the steam dryer adjacent the upper end of the reactor vessel may be used to support a frame 114 above the steam dryer. The frame may comprise two support arms intersecting at the center of the steam dryer. The center of the frame may pivotably mount a boom 116 carrying the inspection device 118 from a cable to pivot around the vertical axis of the dryer a full 360°. The boom 116 may be telescopic or fixed in length if desired. By mounting the frame 114 on the steam dryer, inspection tool operation is simplified by enabling the operator to drive the tool in the same coordinate system as used to track and report inspection progress and results. For example, the angular location of the inspection boom will be the same as the coordinate position for inspection locations on the outside of the dryer. The inspection cable extension and retraction can be calibrated to represent dryer elevation. Additionally, because the radial and elevational axis for the inspection device is aligned and calibrated to the dryer polar coordinate system, items can be measured using the inspection device location feedback information directly from a motion controller. A pointing device, not shown, can be added to the inspection head to improve accuracy of the measurement. Alternatively, the frame can be mounted to mounting lugs in the spent fuel pool or equipment pit and submerged below the water level in the pool and pit. This enables clearance for pass over of the refueling platform and work platform.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of inspecting or utilizing tools in the underwater environment of at least one of a nuclear reactor vessel, a spent fuel pool or an equipment pit surrounded by a floor area at a nuclear reactor site comprising the steps of:
    (a) floating a platform on the surface of water in a water pool overlying a portion of one of the reactor vessel, the spent fuel pool and the equipment pit;
    (b) coupling a boom between the floating platform and a boom support structure moveable about said floor area; and
    (c) deploying an inspection device or a tool from the floating platform to a target site below the water surface to inspect or perform work at the target site.

2. A method according to claim 1 including providing at least one thruster on the platform to drive the platform to a location along the water surface overlying the underwater target site within said one of the reactor vessel, spent fuel pool and equipment pit.

3. A method according to claim 1 wherein said boom is a telescopic boom, the method including displacing the platform toward or away from the support structure by extending and retracting said telescopic boom.

4. A method according to claim 3 including rotating said telescopic boom about a generally vertically extending axis to laterally displace the platform along the water surface.

5. A method according to claim 1 including supporting the weight of the inspection device or tool solely from the floating platform.

6. A method according to claim 1 wherein the step of deploying includes extending a cable from the platform to support the inspection device or tool adjacent to the target site within said one of the reactor vessel, spent fuel pool and equipment pit.

7. A method according to claim 1 including providing a cable drive on the platform, and extending or retracting a cable supporting the inspection device or tool from the cable drive.

8. A method according to claim 1 including providing a cable reel on the support structure and a cable drive on the floating platform, locating a cable along the boom between the cable reel and cable drive, and extending the cable from the platform to support the inspection device or tool adjacent target site in said one of the reactor vessel, spent fuel pool and equipment pit.

9. A method according to claim 1 wherein step (a) includes floating the platform to a position overlying the target site within the nuclear reactor vessel and step (b) includes deploying the device or tool from the platform to the target site within the nuclear vessel.

10. A method according to claim 1 wherein step (a) includes floating the platform to a position overlying the target site within the equipment pit and step (b) includes deploying the device or tool from the platform to the target site within the equipment pit.

11. A method according to claim 1 wherein step (a) includes floating the platform to a position overlying the target site within the spent fuel pool and step (b) includes deploying the device or tool from the platform to the target site within the spent fuel pool.

* * * * *

UNITED STATES PATENT AND TRADEMARK OFFICE
CERTIFICATE OF CORRECTION

| | |
|---|---|
| PATENT NO. | : 7,267,019 B2 |
| APPLICATION NO. | : 11/294433 |
| DATED | : September 11, 2007 |
| INVENTOR(S) | : Morris et al. |

It is certified that error appears in the above-identified patent and that said Letters Patent is hereby corrected as shown below:

Column 3, line 13, after the word "guide" change the numeral "32" to --34--.

Column 3 line 14 after the word "boom" change the numeral "34" to --32--.

Signed and Sealed this

Eighth Day of April, 2008

JON W. DUDAS
*Director of the United States Patent and Trademark Office*